(12) United States Patent
Kasai

(10) Patent No.: US 9,452,900 B2
(45) Date of Patent: Sep. 27, 2016

(54) CONTAINER TERMINAL AND CONTROL METHOD THEREOF

(75) Inventor: Hiroshi Kasai, Oita (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 101 days.

(21) Appl. No.: 14/008,506

(22) PCT Filed: Mar. 26, 2012

(86) PCT No.: PCT/JP2012/057708
§ 371 (c)(1),
(2), (4) Date: Dec. 5, 2013

(87) PCT Pub. No.: WO2012/133278
PCT Pub. Date: Oct. 4, 2012

(65) Prior Publication Data
US 2014/0086709 A1  Mar. 27, 2014

(30) Foreign Application Priority Data
Mar. 29, 2011  (JP) .................................. 2011-072441

(51) Int. Cl.
*B65G 63/00* (2006.01)
*B66C 13/46* (2006.01)
*B65G 67/02* (2006.01)

(52) U.S. Cl.
CPC .............. *B65G 63/004* (2013.01); *B65G 67/02* (2013.01)

(58) Field of Classification Search
USPC ......... 414/139.4, 139.8, 139.9, 140.1, 140.3, 414/140.4, 341, 342, 390, 391, 392, 561
See application file for complete search history.

(56) References Cited

U.S. PATENT DOCUMENTS

| | | | |
|---|---|---|---|
| 6,698,990 B1 * | 3/2004 | Dobner et al. ............. | 414/139.9 |
| 2007/0134076 A1 * | 6/2007 | Tian ........................... | 414/139.4 |
| 2009/0191028 A1 * | 7/2009 | Tian ........................... | 414/140.3 |
| 2011/0217150 A1 * | 9/2011 | Takehara et al. ............. | 414/392 |

FOREIGN PATENT DOCUMENTS

| | | | | |
|---|---|---|---|---|
| DE | 4444418 C1 * | 3/1996 | ............. | B65G 63/00 |
| EP | 302569 A1 * | 2/1989 | ............. | B65G 63/00 |
| JP | 11-292291 A | 10/1999 | | |
| JP | 2000044063 A * | 2/2000 | ............. | B65G 63/00 |
| JP | 2003292167 A * | 10/2003 | ............. | B65G 63/00 |
| JP | 2005-075537 A | 3/2005 | | |

(Continued)

OTHER PUBLICATIONS

International Search Report of PCT/JP2012/057708, mailing date of Jun. 26, 2012.

*Primary Examiner* — Gregory Adams
(74) *Attorney, Agent, or Firm* — Westermann, Hattori, Daniels & Adrian, LLP

(57) ABSTRACT

Provided are a container terminal and a control method thereof that enhance a cargo handling efficiency by reducing a movement of a yard crane to a minimum possible extent. A first transfer area 44 is provided outside one end portion of a storage lane 20, and a transfer stand 50 is provided to the first transfer area 44. The transfer stand 50 transfers a container k between a circulating transport vehicle 31 and a shuttle vehicle 32. The shuttle vehicle 32 transports the container k between the transfer stand 50 and a yard crane 13 or 14 provided to the storage lane 20 by moving back and forth in a field adjacent to the storage lane 20.

3 Claims, 4 Drawing Sheets

(56) References Cited

FOREIGN PATENT DOCUMENTS

| | | | | |
|---|---|---|---|---|
| JP | 2006282384 A | * | 10/2006 | |
| JP | 2009173447 A | * | 8/2009 | |
| JP | 4418195 B2 | | 2/2010 | |
| JP | 2010265117 A | * | 11/2010 | |
| WO | WO 2004074147 A1 | * | 9/2004 | ............ B65G 63/00 |

* cited by examiner

CONTAINER TERMINAL AND CONTROL METHOD THEREOF

TECHNICAL FIELD

The present invention relates to a container terminal and a control method thereof that enhance a cargo handling efficiency and save energy consumption by shortening a moving distance of a yard crane straddling a storage lane in the container terminal.

BACKGROUND ART

A container terminal is a facility where containers are loaded on or unloaded from ships and containers are carried in and out by foreign chassis for overland transport. The container terminal also is a facility where the containers unloaded or carried in are temporarily stored.

Nowadays, along with rapid evolution of container transport systems in international traffic routes, cargo handling and storing works in container terminals have been required to achieve further automation and energy saving. More specifically, what are important are automation, efficiency enhancement, cost reduction and the like in operations of transporting containers between ships and a container terminal and storing containers in the container terminal.

To address this, there is a container terminal including: storage lanes extended in a direction substantially perpendicular to a quay; an automated guided vehicle configured to travel in switchback between the storage lanes; and an area which has a gate placed on the opposite side from the quay side, and in which a foreign chassis and a transfer crane (yard crane) perform cargo handling (for example, see Patent Document 1). This container terminal is intended to increase a storage area ratio and to achieve further automation of the container terminal because foreign chassis, i.e., the foreign chassis attended by operators do not enter the storage region.

However, this container terminal has a problem of a poor cargo handling efficiency, in particular, in operations of carrying a container stored in the storage lane out to the foreign chassis and carrying a container in from the foreign chassis and storing it in the storage lane, since the yard crane moves over the storage lane while holding containers. This is because the moving speed of the yard crane is approximately 18 km/h, which is quite low.

Meanwhile, in the case where a storage lane is provided to extend in the direction substantially perpendicular to the quay, in other words, in the land-and-sea direction, the cargo handling efficiency is enhanced if containers carried in from foreign chassis and being to be loaded on ships are placed on the seaside of the storage lane while containers unloaded from ships and being to be carried out to foreign chassis are placed on the landside of the storage lane. The container terminal described in Patent Document 1, however, requires the yard crane to move for long distances in order to store containers in the storage lane in arrangement with a high cargo handling efficiency. In carrying containers out to and in from the foreign chassis, in particular, the efficiency drops because the yard crane travels over the storage lane while holding the containers.

Moreover, the method in which a yard crane hoists and transports containers is poor in cargo handling efficiency, and therefore has a problem of wasteful energy consumption.

Meanwhile, there is a container terminal which is provided with yard cranes configured to move in a longitudinal direction of a storage lane, and is designed to dividedly store containers to be carried out and containers carried in. This container terminal includes a yard crane 111 straddling a storage lane 110, and a large yard crane 112 straddling the yard crane 111 as illustrated in FIG. 8. Since the yard crane 111 and the yard crane 112 can pass each other without collision, this container terminal can store containers k in the storage lane 110 in efficient arrangement. However, the container terminal still has to move the yard cranes 111 and 112 for long distances, and requires a longer time accordingly. In addition, there also arises a problem that the manufacturing cost and maintenance cost for the large-scale yard crane 112 are high.

PRIOR ART DOCUMENT

Patent Document

Patent Document 1: Japanese Patent No. 4418195

SUMMARY OF THE INVENTION

Problem to be Solved by the Invention

In view of the above circumstances, the present invention has an objective to provide a container terminal and a control method thereof that are capable of enhancing a cargo handling efficiency and saving energy consumption by reducing a moving distance (traveling distance) of a yard crane.

Means for Solving the Problem

To solve the foregoing problems, a container terminal of the present invention, which includes a quay crane, and a storage lane where containers are to be placed in predetermined positions, and in which a circulating transport vehicle transports the containers, includes: at least one shuttle vehicle configured to transport a container by moving back and forth in a field in a longitudinal direction thereof, the field located adjacent to the storage lane; a first transfer area which is provided outside one end portion of the storage lane and in which the circulating transport vehicle and the shuttle vehicle transfer the container therebetween; and a transfer stand provided to straddle a route shared by the circulating transport vehicle and the shuttle vehicle in the first transfer area and including a hoist tool configured to lift up and down the container.

In this configuration, the transfer stand straddling the route shared by the circulating transport vehicle and the shuttle vehicle is provided in the first transfer area provided outside the end portion of the storage lane, whereby the transfer stand is able to receive and pass the container. Then, the shuttle vehicle is able to transport containers by moving back and forth between the transfer stand and a yard crane provided to the storage lane.

Thus, since the yard crane does not have to transport the containers, the moving distance (traveling distance) of the yard crane can be reduced and the cargo handling efficiency of the container terminal can be enhanced. In addition, the transfer stand which consumes less energy than the yard crane transfers containers between the circulating transport vehicle and the shuttle vehicle, which leads to further saving of energy consumption. Moreover, the transfer stand only needs to have functions to perform operations of holding a container and hoisting the container up and down. Thus, the transfer stand can be formed smaller in size than the yard crane and the height of hoisting the container up and down can be made shorter in the transfer stand than in the yard crane. For these reasons, as compared with the yard crane, the transfer stand can be manufactured at low cost and the maintenance cost can be made low as well.

Moreover, in the above container terminal, a first storage lane, a first shuttle vehicle, a second shuttle vehicle, and a second storage lane are arranged in this order as the neighboring storage lanes and the shuttle vehicles, the single transfer stand is provided to straddle a route shared by the circulating transport vehicle and the first shuttle vehicle and a route shared by the circulating transport vehicle and the second shuttle vehicle, and the transfer stand includes a moving mechanism configured to move the hoist tool crosswise in a direction substantially perpendicular to a traveling direction of the first shuttle vehicle and the second shuttle vehicle so that the transfer stand transfers a container between the circulating transport vehicle and the first shuttle vehicle or the second shuttle vehicle.

In this configuration, the two shuttle vehicles are arranged between the two neighboring storage lanes. Then, the transfer stand is formed to straddle the two shuttle vehicles, and the hoist tool can be moved between the two shuttle vehicles. Thus, the single transfer stand can be shared by the two neighboring storage lanes, and the number of transfer stands can be reduced.

In addition, the above container terminal is provided with a first transfer stand and a second transfer stand outside both end portions of the storage lane, the first transfer stand configured to transfer a container between the circulating transport vehicle and the shuttle vehicle, the second transfer stand configured to transfer a container between the shuttle vehicle and a foreign chassis.

In this configuration, the first transfer stand transfers a container between the circulating transport vehicle and the shuttle vehicle in the first transfer area outside the one end portion of the storage lane, whereas the second transfer stand transfers a container between the shuttle vehicle and the foreign chassis in the second transfer area outside the other end portion. Then, the shuttle vehicle can transport a container between the yard crane and the first transfer stand or the second transfer stand, whereby the movement of the yard crane can be reduced. In addition, each storage lane may be provided with only at least one yard crane. Instead of yard crane, transfer stands which can be manufactured at lower cost than the yard crane are used. Accordingly, the manufacturing cost can be also reduced.

To achieve the foregoing objective, a container terminal control method of the present invention is a method of controlling a container terminal which includes a quay crane, a storage lane where containers are to be placed in predetermined positions, and in which a circulating transport vehicle transports the containers, the method including the steps of: transferring a container between the circulating transport vehicle and a shuttle vehicle outside one end portion of the storage lane by a transfer stand performing at least one of an action of hoisting a hoist tool up and down and an action of moving the hoist tool crosswise; and transporting the container to each of the transfer stand and the yard crane by the shuttle vehicle moving back and forth in a field in a longitudinal direction thereof, the field located adjacent to the storage lane.

According to this method, since the shuttle vehicle transports containers for the storage lane, the yard crane does not have to travel while holding a container. Thus, the moving distance of the yard crane can be reduced and accordingly the cargo handling efficiency can be enhanced. In addition, by use of the transfer stand capable of performing the container transfer operation more quickly than the yard crane, the cargo handling efficiency can be further enhanced. Furthermore, the energy consumption can be saved further by reducing the movement of the yard crane and by using the transfer stand which consumes less energy than the yard crane.

Effects of the Invention

According to the present invention, the movement of a yard crane can be reduced in a container terminal performing efficient cargo handling. In addition, the container terminal can further save its energy consumption by reducing the movement of the yard crane and using a transfer stand which consumes less energy than the yard crane.

MODES FOR CARRYING OUT THE INVENTION

Hereinafter, with reference to the drawings, description is provided for container terminals and container terminal control methods according to embodiments of the present invention.

Figure 1:
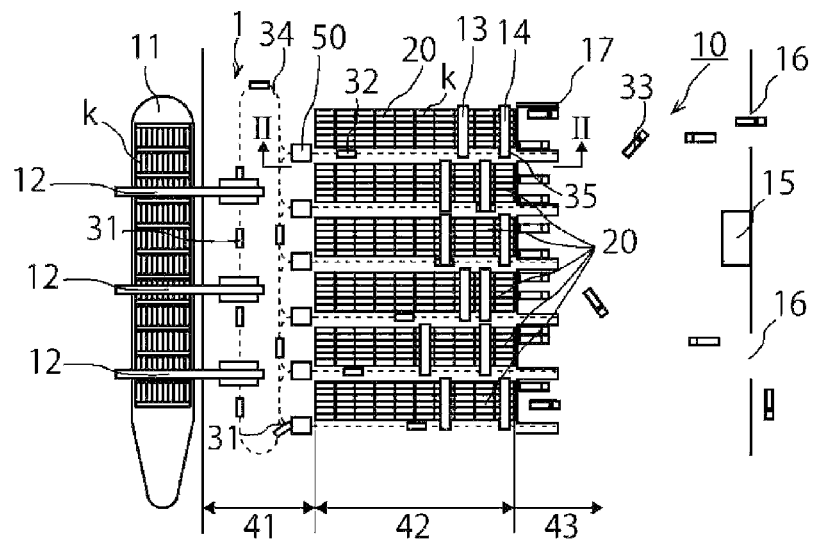
FIG. 1 is a plan view illustrating a container terminal of a first embodiment according to the present invention.

As illustrated in FIG. 1, a container terminal 10 includes a ship 11 that berths at a quay 1, quay cranes 12 in a quay apron region 41, and storage lanes 20 in a storage region 42, the storage lanes 20 having a longitudinal direction arranged in a direction perpendicular to a traveling direction of the quay cranes 12. In addition, in the storage region 42, the container terminal 10 includes multiple storage lanes 20, and first yard cranes 13 and second yard cranes 14 each of which straddles one of the storage lanes 20 and is movable back and forth in the longitudinal direction of the storage lane 20, the first yard crane 13 provided on a seaside (hereinafter referred to as the seaside yard crane 13), the second yard crane 14 provided on a landside (hereinafter referred to as the landside yard crane 14). Moreover, in a gate yard 43, the container terminal 10 includes a management building 15 and gates 16 serving as an entrance from and an exit to the outside.

Here, as one example, the container terminal 10 includes 6 storage lanes having the longitudinal direction arranged in the direction perpendicular to the traveling direction of the quay cranes 12. However, some container terminal 10 may include a storage lane having a longitudinal direction arranged in the traveling direction of the quay cranes 12 and include any number of lanes. In addition, any number of quay cranes 12 may be installed for one ship 11, and the number of ships 11 is not limited to one. A container k is a container of ISO standard having a width of 8 feet, a height of 8 feet, a length of 20 feet or 40 feet, but may be a container of another standard.

Further, in the container terminal 10, circulating transport vehicles 31 travel in the quay apron region 42, shuttle vehicles 32 travel in the storage region 42 and foreign chassis 33 travel in the gate yard 43. There are provided a circular route 34 in which the circulating transport vehicles 31 circularly travel in the quay apron region 41 and shuttle routes 35 in each of which a shuttle vehicle 32 moves back and forth at a field in a longitudinal direction thereof, the field located adjacent to the corresponding one of the storage lanes 20.

Figure 2:
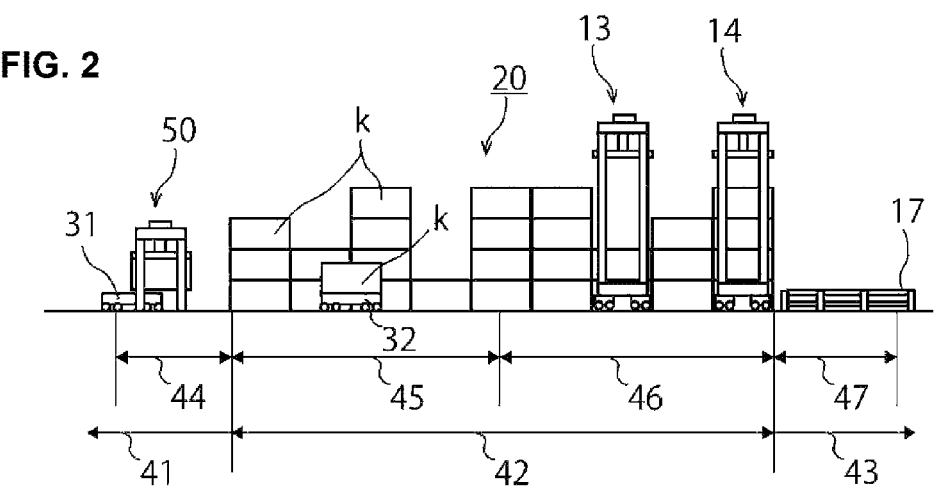
FIG. 2 is a side view taken along II-II in FIG. 1 and an arrow view illustrating an operation of unloading a container from a ship.

As illustrated in FIG. 2, the quay apron region 41 is provided with a first transfer area 44 (hereinafter referred to as the seaside transfer area 44), the storage region 42 is provided with a seaside loading container area 45 where containers carried in are mainly stored, and a landside unloading container area 46 where containers to be carried out are mainly stored, and the gate yard 43 is provided with a second transfer area 47 (hereinafter referred to as the landside transfer area 47). In addition, the landside transfer area 47 includes a safety fence 17 to prevent the foreign chassis 33 from entering the storage region 42.

The loading container area 45 is an area for placing containers k that are carried in by the foreign chassis 33 from the outside of the container terminal 10 and are to be loaded onto the ship 11. The unloading container area 46 is an area for placing containers k that are unloaded from the ship 11 and are to be carried out by the foreign chassis 33 to the outside of the container terminal 10. Such divided arrangement of containers k placed in the storage lane 20 enables efficient cargo handling.

Moreover, the seaside transfer area 44 is equipped with transfer stands 50. The seaside transfer area 44 is an area where the circulating transport vehicles 31 and the shuttle vehicles 32 transfer the containers k therebetween through the transfer stands 50. The landside transfer area 47 is an area where the shuttle vehicles 32 and the foreign chassis 33 transfer the containers k therebetween through the landside yard cranes 14.

Figure 3:
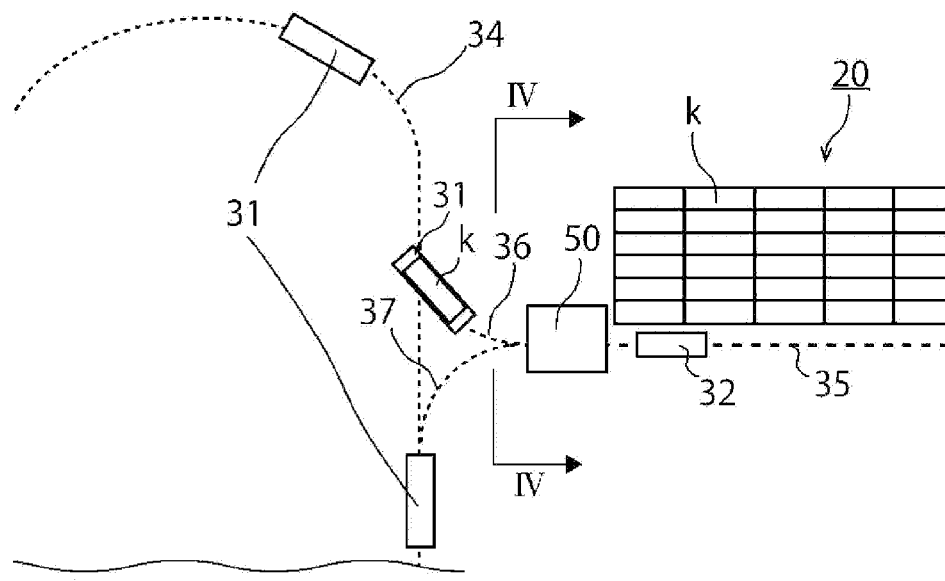
FIG. 3 is an enlarged view illustrating a seaside transfer area 44 in FIG. 1.

As illustrated in FIG. 3, there are provided an access track 36 that allows each of the circulating transport vehicles 31 to enter the shuttle route 35 and an exit track 37 that allows the circulating transport vehicle 31 to travel in switchback and exit from the shuttle route 35 to the circular route 34. A portion of the shuttle route 35 within the range of the seaside transfer area 44 is a route shared by the circulating transport vehicle 31 and the shuttle vehicle 32, and the transfer stand 50 is provided straddling the route.

The circulating transport vehicles 31 are each formed of an automated guided vehicle (hereinafter referred to as an AGV) capable of traveling in switchback, and is equipped with safety check sensors (not illustrated) for collision prevention on the front and rear of the vehicle. Each of the shuttle vehicles 32 may be also formed of an AGV, and can be manufactured at lower cost than the circulating transport vehicle 31, since the shuttle vehicle 32 only has to be able to travel back and forth, and does not necessitate a safety check sensor or the like, for example. The circulating transport vehicle 31 and the shuttle vehicle 32 are not limited to the above configurations, but may be also formed by using, for example, attended transport vehicles. The circular route 34, the shuttle route 35, the access track 36 and the exit track 37 are formed of electromagnetic tapes, rails or the like.

Next, description is provided for a cargo handling operation of a container k performed in a container terminal 10 according to a first embodiment of the present invention. For unloading a container k from a ship 11 to an unloading container area 46 of a storage lane 20, a circulating transport vehicle 31 transports the container k to a transfer stand 50. The circulating transport vehicle 31 travels from an access track 36 into a shuttle route 35 of a seaside transfer area 44 and stops traveling under the transfer stand 50. Then, the transfer stand 50 holds and hoists up the container k. The circulating transport vehicle 31 switchbacks and travels in an exit track 37 and returns to a circular route 34. After the circulating transport vehicle 31 moves from under the transfer stand 50, a shuttle vehicle 32 moves to under the transfer stand 50, and stops traveling.

The transfer stand 50 passes the container k to the shuttle vehicle 32. Then, the shuttle vehicle 32 having received the container k runs in the shuttle route 35, travels to a seaside yard crane 13 or a landside yard crane 14 being on standby at a designated position for placing the container k in the unloading container area 46, and passes the container k to the yard crane 13, 14. The shuttle vehicle 32 having passed the container k to the yard crane 13, 14 returns to the transfer stand 50 in order to transport a container again. The operation of unloading a container k from the ship 11 is completed in the aforementioned actions. This operation is performed for all designated containers k in the ship 11. An operation of loading a container k onto the ship 11 is performed by taking the above actions in the reversed order.

Through the foregoing operations, the container terminal 10 can reduce a movement of the yard crane 13, 14 even when containers are stored in arrangement with a high cargo handing efficiency in the storage lane 20. This is because, since the circulating transport vehicle 31 and the shuttle vehicle 32 transfer the container k therebetween via the transfer stand 50 in the seaside transfer area 44, the seaside yard crane 13 does not have to move to the seaside transfer area 44, or the yard crane 13, 14 does not have to travel while holding the container k. In addition, such reductions in the movements of the yard cranes 13, 14 lead to saving of energy consumption in the container terminal.

Figure 4:
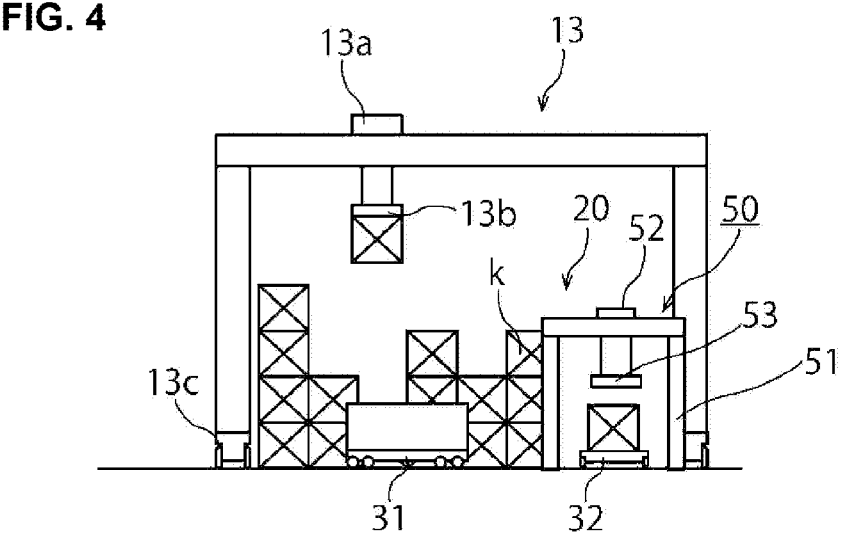
FIG. 4 is a front view taken along IV-IV in FIG. 3.

As illustrated in FIG. 4, the transfer stand 50 includes a leg portion 51, an upper device 52 and a hoist tool 53. The leg portion 51 is formed to allow each of the circulating transport vehicle 31 and the shuttle vehicle 32 to enter the inside of the leg portion 51. The leg portion 51 only has to straddle each of the circulating transport vehicle 31 and the shuttle vehicle 32, and can be formed smaller in size than the yard cranes 13, 14. Moreover, the transfer stand 50 is shaped in a gantry type like the yard cranes, but does not need to include a traveling mechanism because of the non-necessity to travel.

The upper device 52 is capable of hoisting the hoist tool 53 up and down. The hoist tool 53 may be formed suitably by using a spreader in the case of hoisting the container k up and down, but may be instead formed by using a hook block, a grab bucket, a lifting magnet, or the like. Since the transfer stand 50 only has to transfer the container k between the circulating transport vehicle 31 and the shuttle vehicle 32, the height of hoisting the container k up and down can be set lower than the height at which the yard cranes 13, 14 hoist the container k up and down. Moreover, the transfer stand 50 is not limited to the foregoing configuration, but may be also formed by using a top lifter, a reach stacker, or the like as long as it can transfer containers k between the circulating transport vehicle 31 and the shuttle vehicle 32.

In comparison with the yard cranes 13, 14, the transfer stand 50 is small in size, hoists containers k up and down at a low height, and does not have to move. For these reasons, the transfer stand 50 can make the energy consumption less than in the case of using the yard cranes 13, 14 to transfer the containers K. In addition, since the transfer stand 50 is dedicated to the operation of holding and lifting up and down the containers k, the transfer stand 50 is easy to operate and can be also controlled without human attendance. The transfer stand 50 is not limited to the foregoing configuration, but only has to be able to hold and lift up and down the container k from and to each of the circulating transport vehicle 31 and the shuttle vehicle 32.

Figure 5:
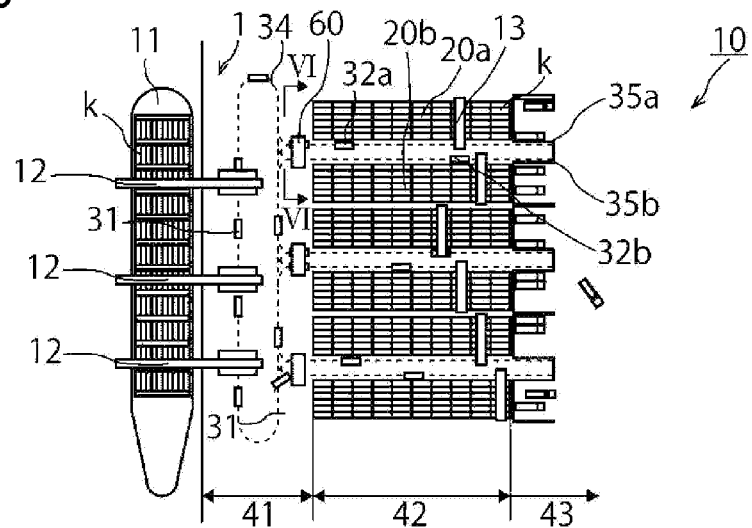
FIG. 5 is a plan view illustrating a container terminal of a second embodiment according to the present invention.
Figure 6:
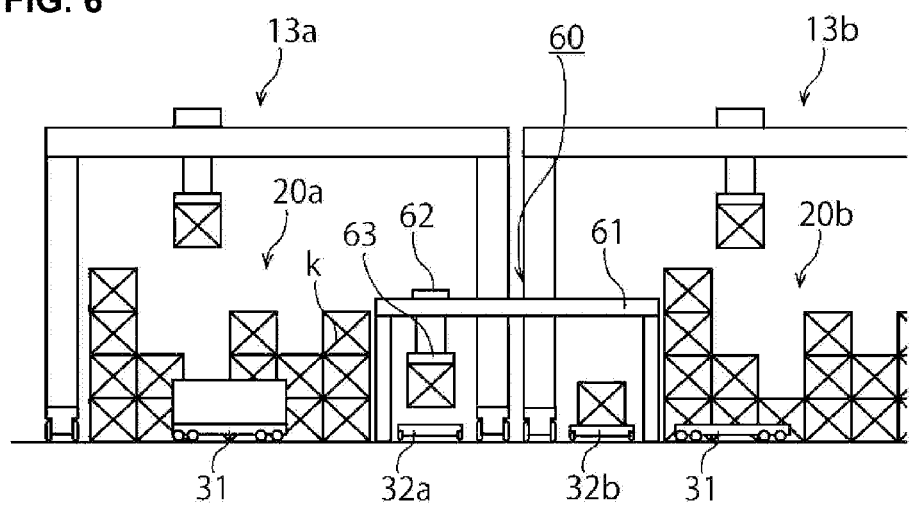
FIG. 6 is an arrow view taken along VI-VI in FIG. 5.

Next, a control terminal 10 according to a second embodiment of the present invention is described. As illustrated in FIGS. 5 and 6, a first shuttle route 35a in which a first shuttle vehicle 32a travels and a second shuttle route 35b in which a second shuttle vehicle 32b travels are provided between a first storage lane 20a and a second storage lane 20b which are neighboring lanes. For other storage lanes 20, two shuttle routes 35 and two shuttle vehicles 32 are similarly provided between the neighboring storage lanes 20. In addition, there are provided a yard crane 13a which straddles the first storage lane 20a and the first shuttle route 35a, and a yard crane 13b which straddles the second storage lane 20b and the second shuttle route 35b.

Moreover, the container terminal 10 is provided with a transfer stand 60 to straddle the first shuttle vehicle 32a and the second shuttle vehicle 32b. The transfer stand 60 includes a leg portion 61, a trolley (upper device) 62 and a hoist tool 63. The leg portion 61 is formed to straddle the two shuttle vehicles 32a, 32b and the shuttle routes 35a, 35b and to allow a circulating transport vehicle 31 to enter the inside of the leg portion 61. The trolley 62 moves together with the hoist tool 63 on top of the leg portion 61 in a direction substantially perpendicular to the traveling direction of the shuttle vehicles 32a, 32b.

Operations of the container terminal 10 of the second embodiment according to the present invention are almost the same as the aforementioned operations of the container terminal 10 of the first embodiment. The single transfer stand 60 is capable of receiving and passing containers k from and to each of the first shuttle vehicle 32a and the second shuttle vehicle 32b by moving the trolley 62 crosswise.

According to the foregoing configuration, a single transfer stand 60 is provided for two storage lanes 20a, 20b, and thereby cargo handling operations similar to the foregoing ones can be implemented with the hoist tool 63 moved crosswise. Thus, the number of transfer stands 60 provided in the container terminal 10 can be reduced, which results in a reduction of manufacturing cost.

Figure 7:
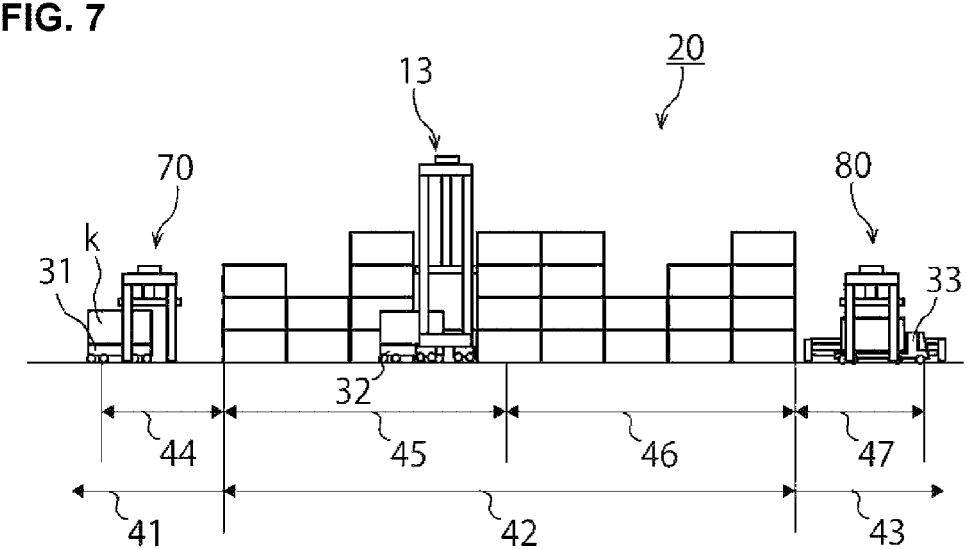
FIG. 7 is a view illustrating a container terminal of a third embodiment according to the present invention.
Figure 8:
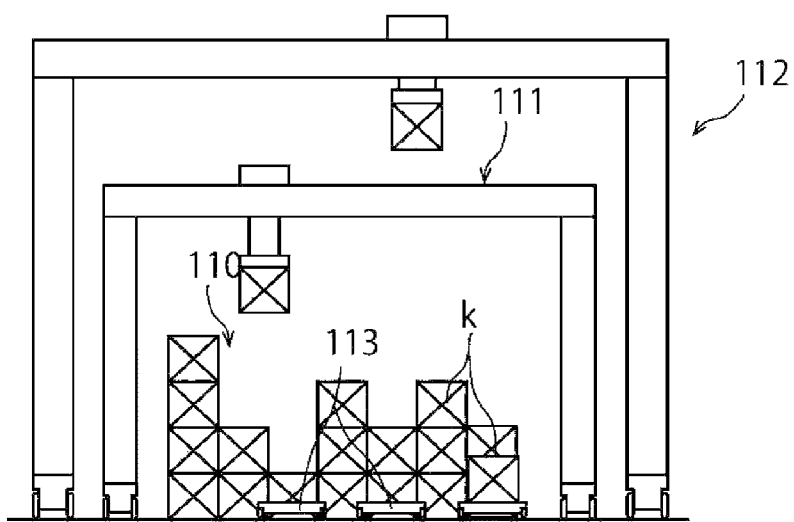
FIG. 8 is a front view illustrating a part of a conventional container terminal.

In a third embodiment according to the present invention, as illustrated in FIG. 7, a first transfer stand 70 and a second transfer stand 80 are provided to a seaside transfer area 44 and a landside transfer area 47 of each storage lane 20, respectively. The storage lane is provided with a single yard crane 13. The first transfer stand 70 transfers containers k between a circulating transport vehicle 31 and a shuttle vehicle 32 in unloading the containers k from a ship 11 and loading the containers k on the ship 11. The second transfer stand 80 transfers containers k between the shuttle vehicle 32 and a foreign chassis 33 in carrying the containers k out to the foreign chassis 33 and carrying the containers k in from the foreign chassis 33.

The aforementioned container terminal 10 is capable of performing operations of carrying containers k out to the foreign chassis 33 and carrying containers kin from the foreign chassis 33 by using the second transfer stand 80, in addition to the foregoing operations of loading and unloading containers k on and from the ship 11 in the first embodiment. The operations are implemented in a similar manner using the foreign chassis 33 in place of the circulating transport vehicle 31 in the loading and unloading operations.

With the above operations, the number of yard cranes 13 provided to the storage lane 20 can be reduced. Moreover, instead of operating the yard crane 13, use of the transfer stands 70, 80 which consume less energy enables a reduction in energy consumption.

INDUSTRIAL APPLICABILITY

A terminal container of the present invention is capable of enhancing a cargo handling efficiency while saving energy consumption by reducing a movement of each yard crane to a minimum possible extent in container handling, and by instead using a transfer stand which consumes less energy. Hence, the container terminal installed at a quay or the like can be used as a base for marine transport and overland transport.

EXPLANATION OF REFERENCE NUMERALS 1 quay
10 container terminal
11 ship
12 quay crane
13 seaside yard crane
14 landside yard crane
20 storage lane
31 circulating transport vehicle
32 shuttle vehicle
33 foreign chassis
34 circular route
35 shuttle route
41 quay apron region
42 storage region
43 gate yard
44 seaside transfer area (first transfer area)
45 loading container area
46 unloading container area
47 landside transfer area (second transfer area)
50, 60, 70, 80 transfer stand

The invention claimed is:
1. A container terminal comprising:
a quay crane;
first and second storage lanes where containers are to be placed in predetermined positions, and a field located adjacent to the storage lanes;
a first yard crane configured to straddle the first storage lane and movable in a longitudinal direction;
a second yard crane configured to straddle the second storage lane and movable in the longitudinal direction;
a circulating transport vehicle which circulates between the quay crane and the first and second storage lanes and is configured to transport a container;
first and second shuttle vehicles which are different from the circulating transport vehicle and configured to each transport a container by moving back and forth in the field located adjacent to the storage lanes in the longitudinal direction;

the first storage lane, the first shuttle vehicle, the second shuttle vehicle, and the second storage lane arranged in this order as neighboring storage lanes and shuttle vehicles;

a first transfer area in which the circulating transport vehicle transfers a container, the first transfer area being provided outside one end portion of the first and second storage lanes;

a single transfer stand with a hoist tool configured to lift the container up and down only, wherein the transfer stand straddles a route shared by the circulating transport vehicle and the first shuttle vehicle and a route shared by the circulating vehicle and the second shuttle vehicle, and is fixed to the first transfer area and transports a container between the circulating transport vehicle and the first and second shuttle vehicles in the first transfer area through use of the hoist tool; and the transfer stand includes a moving mechanism configured to move the hoist tool crosswise in a direction substantially perpendicular to a traveling direction of the first shuttle vehicle and the second shuttle vehicle so that the transfer stand transfers a container between the circulating transport vehicle and one of the first shuttle vehicle and the second shuttle vehicle, wherein at least one storage lane includes two end portions and wherein the container terminal includes a first transfer stand and a second transfer stand provided outside both end portions of the at least one storage lane, the first transfer stand is configured to transfer a container between the circulating transport vehicle and at least one shuttle vehicle, and the second transfer stand is configured to transfer a container between the at least one shuttle vehicle and a foreign chassis.

2. A container terminal comprising: a quay crane;

first and second storage lanes where containers are to be placed in predetermined positions, and a field located adjacent to the storage lanes;

a first yard crane configured to straddle the first storage lane and movable in a longitudinal direction;

a second yard crane configured to straddle the second storage lane and movable in the longitudinal direction;

a circulating transport vehicle which circulates between the quay crane and the first and second storage lanes and is configured to transport a container;

first and second shuttle vehicles which are different from the circulating transport vehicle and configured to each transport a container by moving back and forth in the field located adjacent to the storage lanes in the longitudinal direction;

the first storage lane, the first shuttle vehicle, the second shuttle vehicle, and the second storage lane arranged in this order as neighboring storage lanes and shuttle vehicles;

a first transfer area in which the circulating transport vehicle transfers a container, the first transfer area being provided outside one end portion of the first and second storage lanes;

a single transfer stand with a hoist tool configured to lift the container up and down only, wherein the transfer stand straddles a route shared by the circulating transport vehicle and the first shuttle vehicle and a route shared by the circulating vehicle and the second shuttle vehicle, and is fixed to the first transfer area and transports a container between the circulating transport vehicle and the first and second shuttle vehicles in the first transfer area through use of the hoist tool; and the transfer stand includes a moving mechanism configured to move the hoist tool crosswise in a direction substantially perpendicular to a traveling direction of the first shuttle vehicle and the second shuttle vehicle so that the transfer stand transfers a container between the circulating transport vehicle and one of the first shuttle vehicle and the second shuttle vehicle, wherein the first and second storage lanes each include two end portions and a first transfer stand is provided outside one end portion of each of the first and second storage lanes and a second transfer stand is provided outside the other end portion of each of the first and second storage lanes, the first transfer stand is configured to transfer a container between the circulating transport vehicle and the first and second shuttle vehicles, and the second transfer stand is configured to transfer a container between the first and second shuttle vehicles and foreign chassis.

3. A container terminal comprising:

a quay crane;

first and second storage lanes where containers are to be placed in predetermined positions, and a field located adjacent to the storage lanes;

a first yard crane configured to straddle the first storage lane and movable in a longitudinal direction;

a second yard crane configured to straddle the second storage lane and movable in the longitudinal direction;

a circulating transport vehicle which circulates between the quay crane and the first and second storage lanes and is configured to transport a container;

first and second shuttle vehicles which are different from the circulating transport vehicle and configured to each transport a container by moving back and forth in the field located adjacent to the storage lanes in the longitudinal direction;

the first storage lane, the first shuttle vehicle, the second shuttle vehicle, and the second storage lane arranged in this order as neighboring storage lanes and shuttle vehicles;

a first transfer area having first and second shuttle routes in which the circulating transport vehicle transfers a container, the first transfer area being provided outside one end portion of the first and second storage lanes, and a single transfer stand with a hoist tool configured to lift the container up and down only, wherein the transfer stand straddles the first shuttle route shared by and traveled by both the circulating transport vehicle and the first shuttle vehicle and the second shuttle route shared by and traveled by both the circulating vehicle and the second shuttle vehicle, and is fixed to the first transfer area and transports a container between the circulating transport vehicle and the first and second shuttle vehicles in the first transfer area through use of the hoist tool; and the transfer stand includes a moving mechanism configured to move the hoist tool crosswise in a direction substantially perpendicular to a traveling direction of the first shuttle vehicle and the second shuttle vehicle so that the transfer stand transfers a container between the circulating transport vehicle and one of the first shuttle vehicle and the second shuttle vehicle.

* * * * *